United States Patent Office 3,127,357
Patented Mar. 31, 1964

3,127,357
NOVEL PHOSPHONYL POLYMERS
Albert Y. Garner, Springfield, Mass., assignor to Monsanto Chemical Company, St. Louis, Mo., a corporation of Delaware
No Drawing. Filed Oct. 14, 1959, Ser. No. 846,255
6 Claims. (Cl. 260—2)

This invention is a continuation in part of copending application Serial No. 804,868, filed April 8, 1959. It relates to novel phosphonyl polymers. More particularly, it relates to novel linear tertiary phosphine oxide polymers and methods for their preparation.

The technology of phosphorus polymers has heretofore remained relatively undeveloped. However, these polymers are growing increasingly attractive for use in specialized applications wherein their novel properties may be advantageously utilized.

It is an object of this invention to provide novel phosphorus containing polymers.

Another object is the provision of novel linear tertiary phosphine oxide polymers and a process for their manufacture.

Another object is the provision of novel thermally stable polymers.

A further object is the provision of novel polar polymers.

These and other objects are obtained by contacting in an organic solvent solution, a linear polyphosphine, of a class as hereafter set forth, with at least an equivalent proportion of an oxidizing agent.

The following examples are presented in illustration of the invention and are not intended as limitations thereon.

*Example I*

Twenty grams of a viscous linear interpolymer having a number average molecular weight of about 600 and comprised of substantially equimolar proportions of phenyl phosphine and diallyl are dissolved in 150 ml. of acetone together with 60 ml. of a 3% by weight aqueous potassium permanganate solution. The resulting solution is stirred at about room temperature for 15 hours; after which the remaining permanganate is inactivated by adding, dropwise, a 1 normal aqueous sodium bisulfite solution until the characteristic permanganate color disappears. Inorganic salts are removed by filtration, followed by vacuum distillation of the filtrate to remove water and acetone. A colorless, viscous polymer, soluble in ethanol and benzene, is obtained. Analysis and infrared spectroscopy establish the polymer as being comprised of a plurality of structural units corresponding to the following formulae, each moiety being present in substantially equimolar proportions.

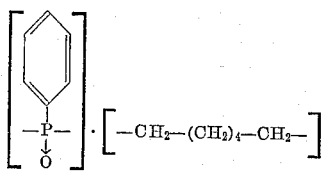

*Example II*

Twenty grams of a solid linear interpolymer having a number average molecular weight of about 180,000 and comprised of substantially equimolar proportions of phenylphosphine and diallyl ether are dissolved in 150 ml. of glacial acetic acid together with 1 gram of lead tetraacetate. The resulting solution is heated at reflux for about 10 hours; then is cooled and poured into an excess of hexane to precipitate a tough, flexible polymer. This polymer is soluble in ethanol and benzene. Upon testing for flammability by holding a lump of the polymer in the flame of a Meeker burner until ignited, the polymer is found to be self-extinguishing. Analysis and infrared spectroscopy establish the polymer as being comprised of a plurality of structural units corresponding to the following formulae, each moiety being present in substantially equimolar proportions.

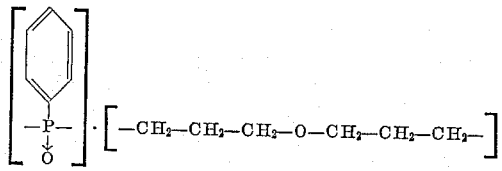

*Example III*

Twenty grams of a solid linear interpolymer having a number average molecular weight of about 400,000 and comprised of substantially equimolar proportions of phenylphosphine and p-divinylbenzene are dissolved in 150 ml. of acetone together with 5 ml. of 90% by weight aqueous hydrogen peroxide solution. The resulting solution is heated at reflux for about 10 hours; then is cooled and poured into an excess of hexane to precipitate a hard, rigid polymer. This polymer is soluble in ethanol and benzene. Upon testing for flammability by holding a lump of the polymer in the flame of a Meeker burner until ignited, the polymer is found to be self-extinguishing. Analysis and infrared spectroscopy establish the polymer as being comprised of a plurality of structural units corresponding to the following formulae, each moiety being present in substantially equimolar proportions.

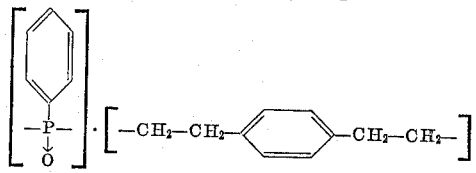

*Example IV*

Twenty grams of a solid linear interpolymer having a number average molecular weight of about 300,000 and comprised of substantially equimolar proportions of cyclohexylphosphine and p-divinylbenzene are dissolved in 175 ml. of dioxane together with 1 gram of sodium persulfate. The resulting solution is heated at about 40° C. for 8 hours, then is cooled and poured into an excess of hexane to precipitate a hard, rigid polymer. This polymer is soluble in ethanol and benzene. Upon testing for flammability by holding a lump of the polymer in the flame of a Meeker burner until ignited, the polymer is found to be self-extinguishing. Analysis and infrared spectroscopy establish the polymer as being comprised of a plurality of structural units corresponding to the following formulae, each moiety being present in substantially equimolar proportions.

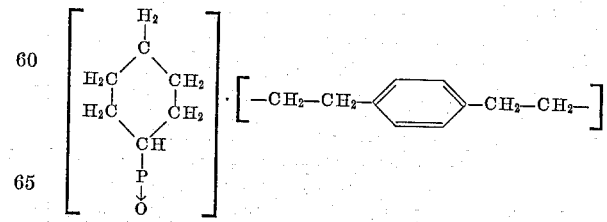

The linear phosphine polymers employed in the practice of this invention are interpolymers of from 40–60 mol percent of a mono-substituted phosphine and, correspondingly, from 60–40 mol percent of a non-conjugated diene monomer. Thus, these polymers are comprised of a plurality of structural units of the general formula:

in conjunction with a plurality of structural units corresponding to the general formula:

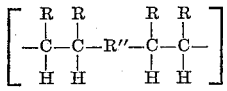

In these formulae, R' is a hydrocarbon radical containing from 1-12 carbon atoms and each R group may be, independently, either hydrogen or an alkyl radical containing from 1-4 carbon atoms. In a preferred embodiment, all four R groups are hydrogen radicals. R'' may be (a) an alkylene radical containing from 1-5 carbon atoms, (b) an arylene radical containing from 6-14 carbon atoms or, in various other embodiments, a radical corresponding to one of the following formulae:

(c) 

(d) 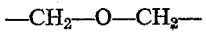

(e) 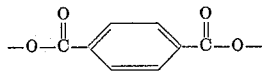

(f) 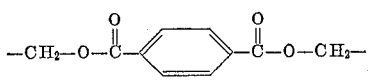

(g) 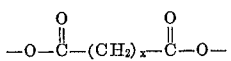

(h) 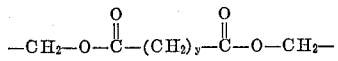

In these latter formulae, $x$ and $y$ are integers of from 1-8.

Such polymers may be readily prepared as set forth in copending application, Serial No. 804,868, filed April 8, 1959, now U.S. Patent 3,010,946, of which this application is a continuation in part. Those polymers oxidized in the foregoing examples may be replaced, for example, with linear interpolymers of any of the mono-substituted phosphines and diene monomers disclosed in said copending application with equivalent results.

The linear tertiary phosphine oxide polymers of this invention are prepared by oxidizing the corresponding linear phosphine polymer, supra, with at least a stoichiometric proportion of an oxidizing agent having a single electrode potential at 25° C. of from about −0.55 to −2.1, as conventionally measured in aqueous solution. The negative value of said single electrode potential arises from the convention wherein, by definition, the chemical reaction occurring at the theoretical half cell proceeds from the reduced state to the oxidized state. For convenience, reference shall hereinafter be made to the activity of the oxidizing agents, it being understood that highly active oxidizing agents have a single electrode potential near the −2.1 limit and, conversely, oxidants of relatively low activity approach the −0.55 limit. Suitable oxidizing agents included within the scope of the above E.M.F. range may be found by reference to any standard chemical handbook, etc., such as e.g., Lang's Handbook of Chemistry, the Handbook of Chemistry and Physics, the Kirk-Othmer Encylclopedia of Chemical Technology, etc. Included in such lists of oxidizing agents are organic peracids, inorganic acids, metal salts of organic and inorganic acids, oxidizing ions, etc. Therefore, if desired, the hydrogen peroxide, potassium permanganate, lead tetraacetate and sodium persulfate employed in the examples may be replaced with, for example, peracetic acid, performic acid, perpropionic acid, perbenzoic acid, Caro's acid, persulfuric acid, nitric acid, perchloric acid, lithium periodate, potassium iodate, sodium bromate, sodium arsenate, potassium perchlorate, lithium stibnate, potassium bismuthate, sodium rhenate, or similar compounds releasing, for example, such oxidizing ions as $CeOH^{+3}$, $Au^{+3}$, $Mn^{+3}$, $Ag^{+1}$, $Ag^{+2}$, $PtCl_6^{-2}$, $Hg^{+2}$, $Br_3^{-1}$, $Cr_2O_7^{-2}$, etc.

The oxidation reaction is effected in a polar organic solvent. While many suitable solvents will not be susceptible to oxidation in the process of this invention, this invention is not limited to such solvents. However, when oxidizable solvents are employed, the solvent should be carefully selected, giving due consideration to the particular oxidizing agent to be employed and the process conditions, so as not to interfere with the preferential oxidation of the linear phosphine polymer. Suitable solvents include dioxane, acetone, glacial acetic acid, tetrahydrofuran, acetonitrile, polyethylene glycols, etc. Most of the oxidizing agents employed will operate satisfactorily in the organic solution. However, if desired, the efficacy of the insoluble or relatively inactive oxidizing agents may be increased by employing aqueous solutions thereof in conjunction with water miscible organic solvents.

The rate of oxidation of the linear phosphine polymer varies directly with both the reaction temperature and the activity of the oxidizing agent. In general, reaction temperatures of from about room temperature to reflux may be employed, using super-atmospheric pressures, if desired, to raise the reflux temperature and shorten the reaction time. Substantially complete oxidation of the phosphorus groups can be effected within about 10 to 15 hours depending upon the conditions employed. If desired, partial oxidation of the phosphorus groups may be obtained by terminating the reaction at any stage.

The linear tertiary phosphine oxide polymers produced according to the teachings of this invention may be obtained in up to 100% yield, depending upon the reaction conditions employed. They may be recovered from the final reaction mixture using conventional techniques. For example, the fluid polymeric products may be recovered by vacuum distillation after inactivating any residual oxidizing agent with an equivalent proportion of a reducing agent. The solid polymeric oxides may be recovered by pouring the final reaction mixture into an excess of a non-solvent such as hexane, etc. or other non-polar hydrocarbons.

The linear tertiary phosphine oxide polymers of this invention range in molecular weight from about 500 to 500,000 as determined by the number average method, depending upon the molecular weight of the linear phosphine polymer employed. Those of lower molecular weight are generally viscous fluids while those of higher molecular weight are generally solids ranging from soft and flexible to tough and rigid. In most instances they are self-extinguishing, being unable to support combustion. The marked polarity of these linear tertiary phosphine oxide polymers renders them generally soluble in polar solvents such as alcohols, ketones, etc.

These linear tertiary phosphine oxide polymers find wide and varied application. For example, they are useful as metal complexing resins, detergents, water softeners, etc. They may also be employed as flame-proofing agents in textiles, wood, paper, etc. The fluid linear tertiary phosphine oxide polymers are admirably suited for use as hydraulic fluids in critical applications, e.g., aircraft, etc. or as adhesives, whereas their solid counterparts may be extruded or cast as films, sheets, tubing, etc., e.g., electrical insulation, fire barriers, surface coatings, etc.

*Example V*

A rectangular chip of ponderosa pine measuring about ¼" x 1" x 3" is immersed for 4 hours in 100 ml. of a 75% by weight solution of the linear tertiary phosphine oxide polymer prepared in Example I dissolved in benzene. The pine chip is then heated in an air oven at 80° C. for about 3 hours to remove all adsorbed solvent.

Testing for flammability by holding the pine chip vertically in the flame of a Meeker burner until ignited, the chip is found to be self-extinguishing.

The linear tertiary phosphine oxide polymers of this invention may be modified by the incorporation therein of conventional additives such as dyestuffs, fillers, extenders, stabilizers, lubricants, etc. They may be used alone or in combination with other polymeric materials, e.g., with vinyl, vinylidene, aminoplast, phenolic, etc. polymers.

It is obvious that many variations may be made in the products and processes set forth above without departing from the spirit and scope of this invention.

What is claimed is:

1. A linear tertiary phosphine oxide polymer consisting essentially of a plurality of recurring structural units, from 40–60% of which correspond to the general formula:

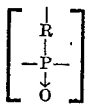

and, correspondingly, from 60–40% of which correspond to the general formula:

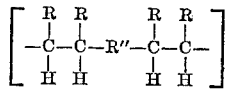

wherein, in the above formulae, R' is a hydrocarbon radical containing from 1–12 carbon atoms, the R groups are radicals independently selected from the group consisting of hydrogen and alkyl radicals containing from 1–4 carbon atoms and R" is a radical selected from the group consisting of (a) alkylene radicals containing from 1–5 carbon atoms, (b) arylene radicals containing from 6–14 carbon atoms, (c)                      —O—

(d)                    —CH$_2$—O—CH$_2$—

(e)

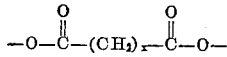

(f)

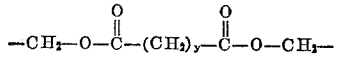

(g) radicals corresponding to the general formula:

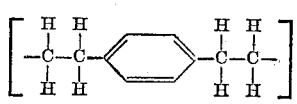

wherein $x$ is an integer of from 1–8, and (h) radicals corresponding to the general formula:

—CH$_2$—O—C(=O)—(CH$_2$)$_y$—C(=O)—O—CH$_2$— wherein $y$ is an integer of from 1–8.

2. A linear tertiary phosphine oxide polymer consisting essentially of a plurality of recurring structural units, from 40–60% of which correspond to the formula:

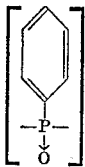

and, correspondingly, from 60–40% of which correspond to the formula:

3. A linear tertiary phosphine oxide polymer consisting essentially of a plurality of recurring structural units, from 40–60% of which correspond to the formula:

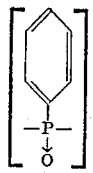

and correspondingly, from 60–40% of which correspond to the formula:

$$\left[ -\underset{H}{\overset{H}{C}} -(CH_2)_4 - \underset{H}{\overset{H}{C}} - \right]$$

4. A linear tertiary phosphine oxide polymer consisting essentially of a plurality of recurring structural units, from 40–60% of which correspond to the formula:

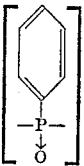

and correspondingly, from 60–40% of which correspond to the formula:

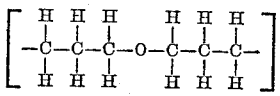

5. A process for preparing the linear tertiary phosphine oxide polymers of claim 1 which comprises contacting a polar organic solvent solution of a linear phosphine polymer with at least a stoichiometric proportion of an oxidizing agent having a single electrode potential of from about —0.55 to —2.1, as measured in aqueous solution; said linear phosphine polymer being comprised of a plurality of recurring structural units, from 40–60% of which correspond to the general formula:

and correspondingly, from 60–40% of which correspond to the general formula:

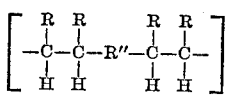

wherein, in the above formulae, R' is a hydrocarbon radical containing from 1–12 carbon atoms, the R groups are radicals independently selected from the group consisting of hydrogen and alkyl radicals containing from 1–4 carbon atoms and R" is a radical selected from the group consisting of (a) alkylene radicals containing from 1–5 carbon atoms, (b) arylene radicals containing from 6–14 carbon atoms, (c)                      —O—

(d)                    —CH$_2$—O—CH$_2$—

(e)

$$-O-\overset{O}{\overset{\|}{C}}-\underset{}{\langle\!\!\!\bigcirc\!\!\!\rangle}-\overset{O}{\overset{\|}{C}}-O-$$

(f)

$$-CH_2-O-\overset{O}{\overset{\|}{C}}-\underset{}{\langle\!\!\!\bigcirc\!\!\!\rangle}-\overset{O}{\overset{\|}{C}}-O-CH_2-$$

(g) radicals corresponding to the general formula:

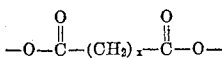

wherein $x$ is an integer of from 1–8, and (h) radicals corresponding to the general formula:

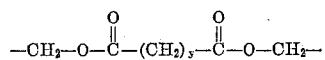

wherein $y$ is an integer of from 1–8.

6. A process as in claim 5 wherein the oxidizing agent is hydrogen peroxide.

References Cited in the file of this patent

UNITED STATES PATENTS

| 2,632,756 | Harman et al. | Mar. 24, 1953 |
| 2,671,078 | McCormack | Mar. 2, 1954 |
| 2,671,080 | McCormack | Mar. 2, 1954 |
| 2,768,153 | Shokel | Oct. 23, 1956 |
| 2,957,931 | Hamilton et al. | Oct. 25, 1960 |

OTHER REFERENCES

Organophosphorus Compounds; Kosolapoff, John Wiley and Sons, Inc., N.Y. (1950), page 98 relied on.